US006965688B2

(12) United States Patent
Shimamura et al.

(10) Patent No.: US 6,965,688 B2
(45) Date of Patent: Nov. 15, 2005

(54) THREE-DIMENSIONAL MODEL ANALYZING APPARATUS DETECTING AND SMOOTHING EDGES BEFORE ANALYTIC OPERATION

(75) Inventors: Kouichi Shimamura, Nagano (JP); Gen Kamurai, Nagano (JP)

(73) Assignee: Fujitsu Nagano Systems Engineering Limited, Nagano (JP)

( * ) Notice: Subject to any disclaimer, the term of this patent is extended or adjusted under 35 U.S.C. 154(b) by 589 days.

(21) Appl. No.: 09/803,152

(22) Filed: Mar. 12, 2001

(65) Prior Publication Data

US 2001/0051002 A1 Dec. 13, 2001

(30) Foreign Application Priority Data

Jun. 12, 2000 (JP) ............................ 2000-174926

(51) Int. Cl.[7] ................................................ G06K 9/00
(52) U.S. Cl. ..................................................... 382/154
(58) Field of Search ........................ 382/154; 345/419, 345/424

(56) References Cited

U.S. PATENT DOCUMENTS

| | | | | |
|---|---|---|---|---|
| 5,038,302 | A * | 8/1991 | Kaufman | 345/424 |
| 5,345,490 | A * | 9/1994 | Finnigan et al. | 378/4 |
| 5,892,515 | A * | 4/1999 | Kobayashi et al. | 345/423 |
| 6,204,853 | B1 * | 3/2001 | Cline et al. | 345/424 |
| 6,606,090 | B2 * | 8/2003 | Shimamura | 345/419 |
| 6,671,656 | B2 * | 12/2003 | Shimamura | 702/183 |

* cited by examiner

*Primary Examiner*—Andrew W. Johns
*Assistant Examiner*—Shervin Nakhjavan
(74) *Attorney, Agent, or Firm*—Staas & Halsey LLP

(57) ABSTRACT

In a three-dimensional model analyzing apparatus for analyzing a physical property of a three-dimensional model, an information receiving unit receives information on a three-dimensional model as an object to be analyzed, an edge detecting unit detects an edge of the three-dimensional model, a smoothing unit smoothes the edge, and an analyzing unit analyzes the three-dimensional model in accordance with the finite element method after the edge is smoothed by the smoothing unit.

4 Claims, 12 Drawing Sheets

THREE-DIMENSIONAL MODEL ANALYZING APPARATUS DETECTING AND SMOOTHING EDGES BEFORE ANALYTIC OPERATION

BACKGROUND OF THE INVENTION

1) Field of the Invention

The present invention relates to a three-dimensional model analyzing apparatus which analyzes physical properties of a three-dimensional model.

2) Description of the Related Art

The finite element method is known as an approximate calculation method for research of physical systems of a continuum, and used in the fields of structural mechanics, electric field theory, and fluid mechanics.

In the finite element method, a three-dimensional model as an object to be analyzed is divided into a plurality of small portions (finite elements), and function approximation of each finite element is made in order to obtain an algebraic equation.

Conventionally, the object to be analyzed is manually divided. Usually, portions of the object having acute curvature is divided into smaller finite elements, and other portions of the object having gentle curvature is divided into greater finite elements, since stress concentration is likely to occur in the portions having acute curvature.

However, the result of analysis can vary according to the manner of division. For example, the result of analysis varies according to the degree of skill of an operator.

In order to solve the above problem, the so-called VOXEL method is proposed. In the VOXEL method, before analysis, an object to be analyzed is divided into a plurality of hexahedral elements, called VOXELs, having an identical shape. Since the object is divided into a plurality of elements having an identical shape, processing for analysis becomes easy, and the object can be automatically divided by software. Nevertheless, in the VOXEL method, edges of the object to be analyzed become singular points, and therefore the accuracy of the analysis often decreases. The singular point is a point at which a curve has no smoothly turning tangent.

SUMMARY OF THE INVENTION

An object of the present invention is to provide a three-dimensional model analyzing apparatus which can obtain a highly accurate result of analysis in accordance with the finite element method regardless of the degree of skill of the operator.

(1) According to the first aspect of the present invention, there is provided a three-dimensional model analyzing apparatus for analyzing a physical property of a three-dimensional model, comprising: an information receiving unit which receives information on a three-dimensional model as an object to be analyzed; an edge detecting unit which detects an edge of the three-dimensional model; a smoothing unit which smoothes the edge; and an analyzing unit which analyzes the three-dimensional model in accordance with the finite element method after the edge is smoothed by the smoothing unit.

According to the present invention, edges of the object to be analyzed are detected and smoothed before the object is analyzed. Therefore, the accuracy of the analysis can be increased.

The three-dimensional model analyzing apparatus according to the first aspect of the present invention may also have one or any possible combination of the following additional features (i) and (iv).

(i) The edge detecting unit may detect only at least one edge having an angle which does not exceed a predetermined amount.

(ii) The smoothing unit may transform the edge into a curved surface having a predetermined radius of curvature.

(iii) In the three-dimensional model analyzing apparatus having the additional feature (ii), the analyzing unit may analyze the three-dimensional model in accordance with the finite element method after dividing the three-dimensional model into a plurality of hexahedral elements which are formed with edges each having a length shorter than the predetermined radius of curvature.

(iv) The three-dimensional model analyzing apparatus having the additional feature (iii) may further comprise a number-of-divisions varying unit which varies the number of the plurality of hexahedral elements, and the analyzing unit may determines a converged value of the physical quantity based on a local maximum of calculated values of the physical quantity which are obtained while increasing the number of the plurality of hexahedral elements by the number-of-divisions varying unit.

(2) According to the second aspect of the present invention, there is provided a computer-readable storage medium storing a program which makes a computer execute a process for analyzing a physical property of a three-dimensional model, the program further makes the computer realize: an information receiving unit which receives information on a three-dimensional model as an object to be analyzed; an edge detecting unit which detects an edge of the three-dimensional model; a smoothing unit which smoothes the edge; and an analyzing unit which analyzes the three-dimensional model in which the edge is smoothed by the smoothing unit, in accordance with a finite element method.

The computer-readable storage medium according to the second aspect of the present invention may also have the aforementioned additional features (i) and (iv).

The above and other objects, features and advantages of the present invention will become apparent from the following description when taken in conjunction with the accompanying drawings which illustrate preferred embodiment of the present invention by way of example.

DESCRIPTION OF THE PREFERRED EMBODIMENTS

An embodiment of the present invention is explained below with reference to drawings.

(1) Principle of the Invention

Figure 1:
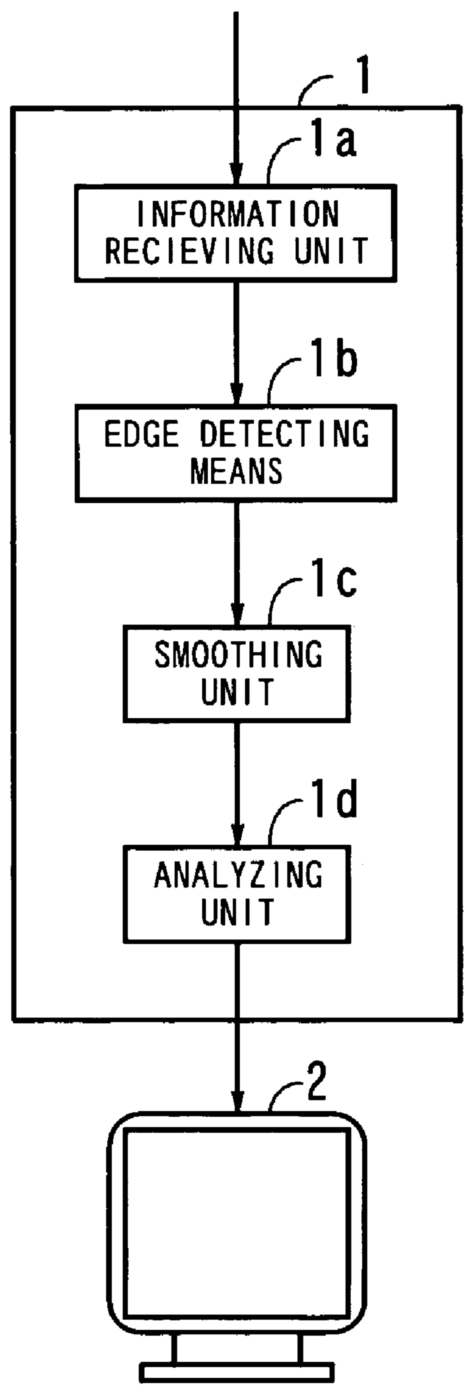
FIG. 1 is a diagram illustrating a basic construction of a three-dimensional model analyzing apparatus according to the present invention.

FIG. 1 is a diagram illustrating a basic construction of a three-dimensional model analyzing apparatus according to the present invention. As illustrated in FIG. 1, the three-dimensional model analyzing apparatus 1 according to the present invention comprises an information receiving unit 1*a*, an edge detecting unit 1*b*, a smoothing unit 1*c*, and an analyzing unit 1*d*. The three-dimensional model analyzing apparatus 1 receives information on a three-dimensional model, performs strength analysis or the like of the three-dimensional model, and displays a result of the analysis by the display device 2.

The information receiving unit 1*a* receives information on a three-dimensional model as an object to be analyzed, the edge detecting unit 1*b* detects an edge of the three-dimensional model, the smoothing unit 1*c* smoothes the edge detected by the edge detecting unit 1*b*, and the analyzing unit 1*d* analyzes the three-dimensional model in accordance with the finite element method after the edge is smoothed by the smoothing unit.

The operations of the three-dimensional model analyzing apparatus 1 are explained below.

Figure 2:
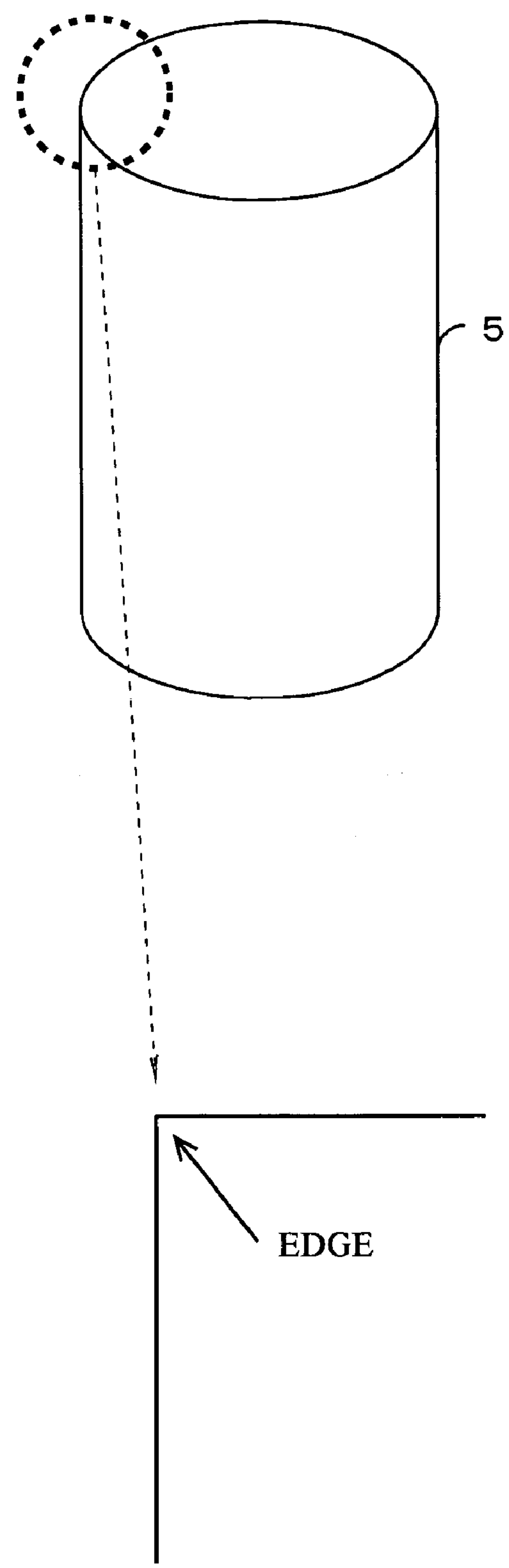
FIG. 2 is a diagram illustrating an example of an edge of an object to be analyzed.
Figure 3:
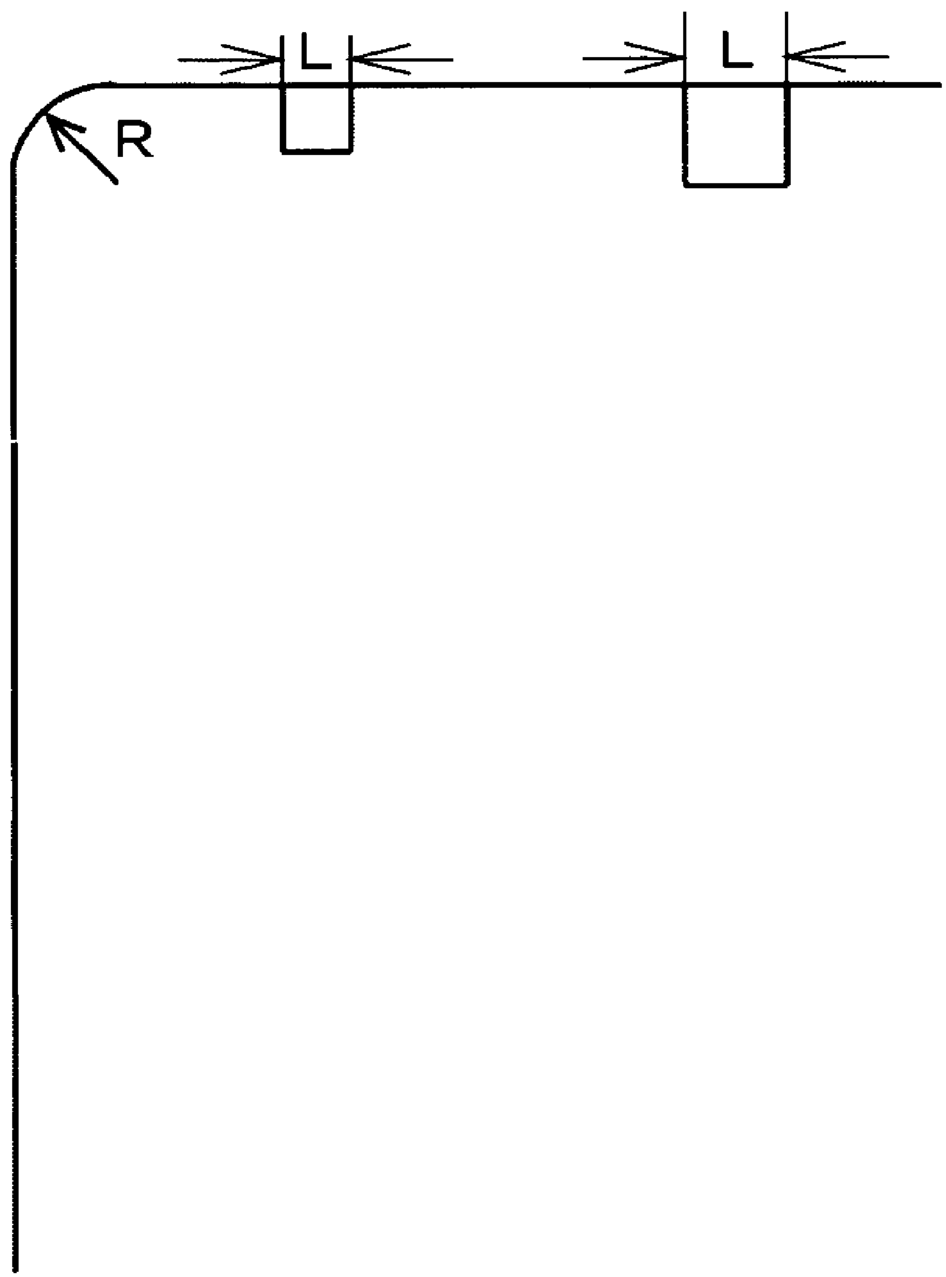
FIG. 3 is a diagram illustrating an example of a rounded edge of an object to be analyzed.

When data of a three-dimensional model 5 as illustrated in FIG. 2, which is to be analyzed, is supplied to the three-dimensional model analyzing apparatus 1, the information receiving unit 1*a* receives the data. Then, the edge detecting unit 1*b* detects edges of the three-dimensional model 5, where each edge is a portion of the object which includes a junction of two surfaces of the object forming an angle which does not exceed a predetermined value (e.g., 100 degrees). A magnified image of a cross section of an edge of the three-dimensional model 5 is also indicated in FIG. 2. In the example of FIG. 2, two circles at which the side (cylindrical) surface meets the top and bottom surfaces, respectively, are detected as edges by the edge detecting unit 1*b*. The smoothing unit 1*c* smoothes the edges detected by the edge detecting unit 1*b*. FIG. 3 is a diagram illustrating an example of a smoothed edge. In the example of FIG. 3, the edge of FIG. 2 is rounded off (smoothed) so as to form a curved surface having a radius R of curvature. The radius R of curvature and the length L of edges of the VOXELs, into which three-dimensional model 5 is divided by the analyzing unit 1*d*, must satisfy the relationship, $L<R$. Therefore, the smoothing unit 1*c* smoothes (rounds off) the edges of the three-dimensional model 5 (as the object to be analyzed) so that the radius R of curvature satisfies the above relationship. The analyzing unit 1*d* divides the three-dimensional model 5, into the VOXELs, analyzes the divided object (three-dimensional model 5) in accordance with the finite element method, and obtains a physical quantity as a result of the analysis.

As explained above, according to the present invention, edges of the object to be analyzed are detected and smoothed before analysis. Since the singular points are removed from the object to be analyzed, an accurate analytic result can be obtained.

In addition, when the edges are rounded off so as to form a curved surface having a radius R of curvature, which is greater then the length L of the edges of the VOXELs, the accuracy of the analysis can be further increased.

(2) Hardware Construction

Figure 4:
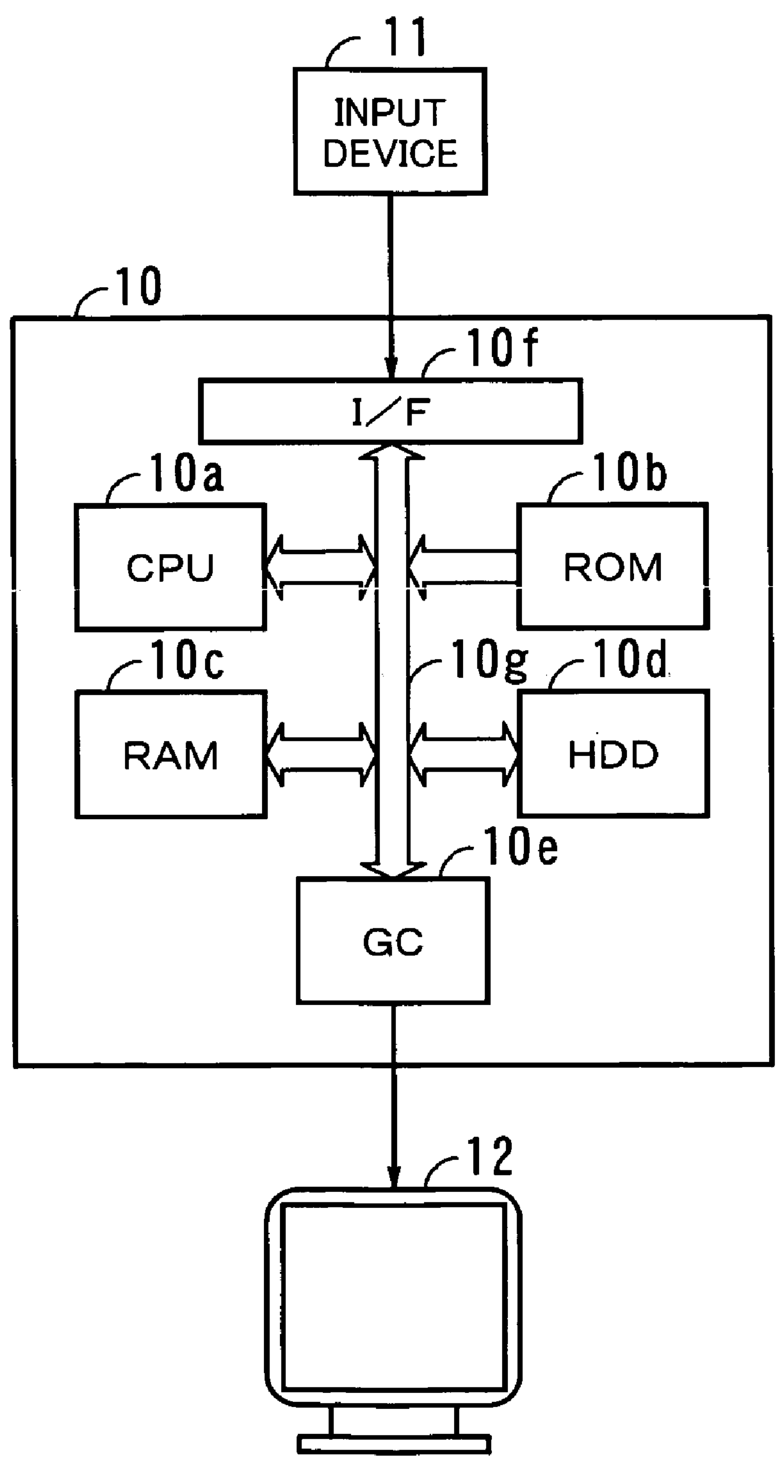
FIG. 4 is a diagram illustrating an example of a hardware construction of a three-dimensional model analyzing apparatus as an embodiment of the present invention.

FIG. 4 is a diagram illustrating an example of a hardware construction of the three-dimensional model analyzing apparatus as an embodiment of the present invention. As illustrated in FIG. 4, the three-dimensional model analyzing apparatus 10 comprises a CPU (Central Processing Unit) 10*a*, a ROM (Read Only Memory) 10*b*, a RAM (Random Access Memory) 10*c*, an HDD (Hard Disk Drive) 10*d*, a GC (Graphic Card) 10*e*, an I/F (Interface) 10*f*, and a bus 10*g*. In addition, an input device 11 and a display device 12 are connected to the three-dimensional model analyzing apparatus 10. The three-dimensional model analyzing apparatus 10 receives information on a three-dimensional model from the input device 11 or the like, analyzes the three-dimensional model, and outputs a result of the analysis to the display device 12.

The CPU 10*a* controls the respective portions of the three-dimensional model analyzing apparatus 10, and executes various kinds of processing in accordance with programs and data stored in HDD 10*d* and the like. The ROM 10*b* stores basic programs to be executed by the CPU 10*a* and data used in the execution of the basic programs. The RAM 10*c* temporarily stores a currently executed program and data related to the execution. The HDD 10*d* stores programs to be executed by the CPU 10*a*, data of an object to be analyzed, and a result of analysis. The GC 10*e* executes processing for drawing images in accordance with a drawing command supplied from the CPU 10*a*, converts the drawn images into video signals, and outputs the video signals to the display device 12. The I/F 10*f* is, for example, a USB (Universal Serial Bus) interface, and transforms formats of data received from the input device 11 so as to be adapted to an internal data format of the three-dimensional model analyzing apparatus 10. The bus 10*g* interconnects the CPU 10*a*, the ROM 10*b*, the RAM 10*c*, the HDD 10*d*, the GC 10*e*, and the interface 10*f* so as to enable data transfer between these parts. The input device 11 is comprised of a mouse, a keyboard, and the like, generates information in response to manipulation of the input device 11 by a user, and supplies the generated information to the three-dimensional model analyzing apparatus 10 through the I/F 10*f*. The display device 12 is realized by a CRT monitor or the like, and displays images based on the video signals output from the GC 10*e*. For example, the display device 12 displays the result of the analysis obtained by the three-dimensional model analyzing apparatus 10.

(3) Operations in Embodiment

Operations of an embodiment of the present invention are explained below.

Figure 5:
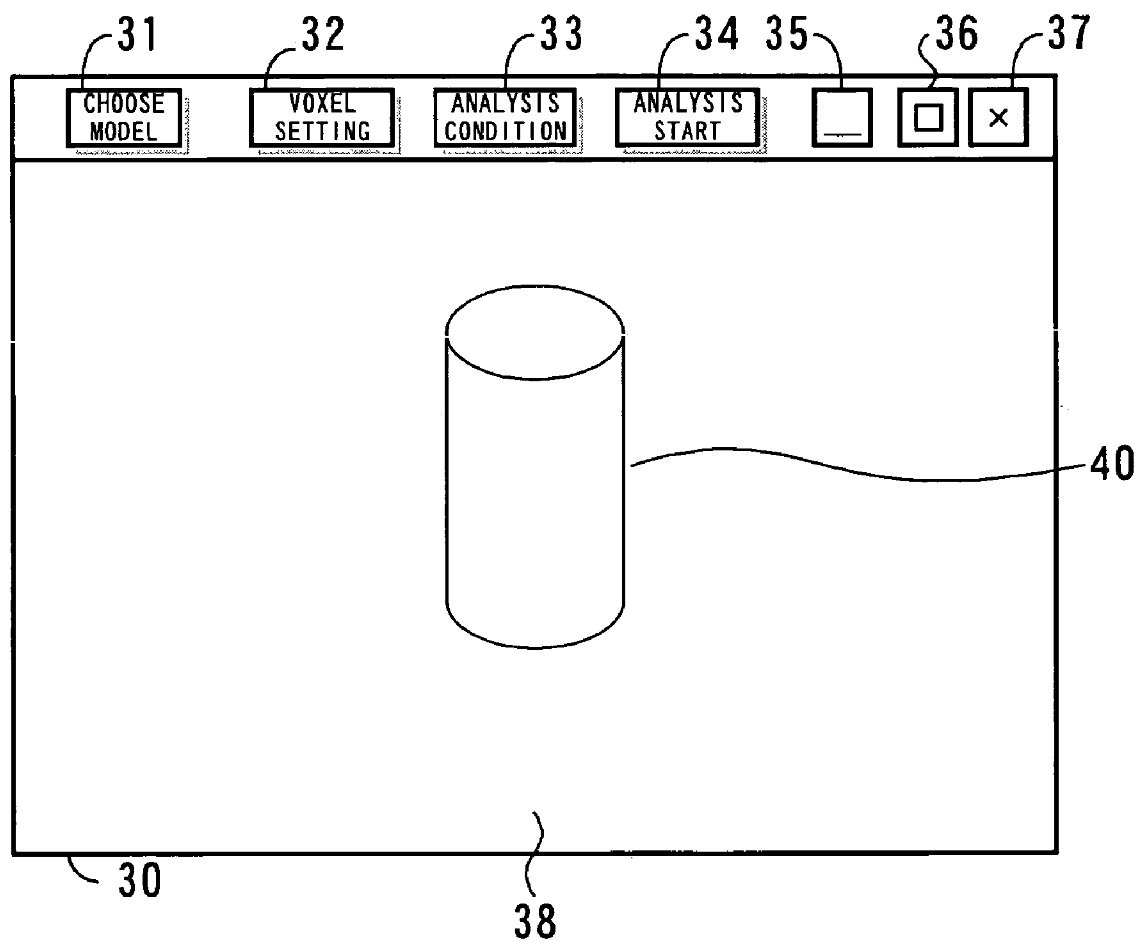
FIG. 5 is a diagram illustrating an example of a window displayed by the display device in FIG. 4, where an object before edge smoothing processing is displayed in the window.

When application software for analytic processing is started, for example, a window 30 illustrated in FIG. 5 is displayed by the display device 12. In the example of FIG. 5, a cylinder is selected as an object to be analyzed. In the window 30, the "CHOOSE MODEL" button 31 is manipulated by an operator when the operator designates a model as an object to be analyzed. The "VOXEL SETTING" button 32 is manipulated by the operator when the operator sets a condition of division of the object into VOXELs. The "ANALYSIS CONDITION" button 33 is manipulated by the operator when the operator sets a condition for analysis of the object in accordance with the finite element method. The "ANALYSIS START" button 34 is manipulated by the operator when the operator starts the analysis of the object under the set condition. The other buttons 35 to 37 are manipulated by an operator when the operator reduces, enlarges, and closes the window 30, respectively. In the display area 38, a three-dimensional model as an object to be analyzed is displayed. In the example of FIG. 5, the cylinder is displayed as an object 40.

Figure 6:
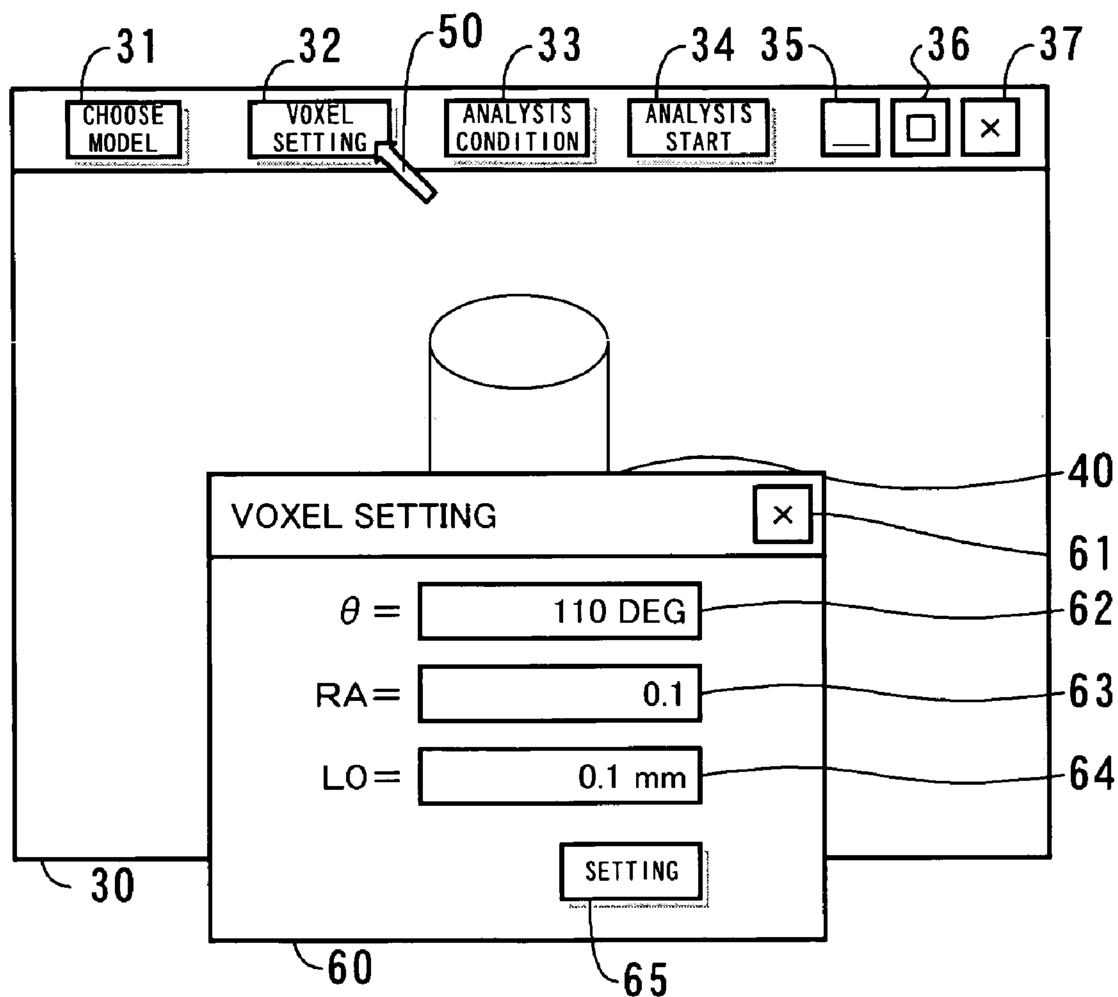
FIG. 6 is a diagram illustrating an example of a subwindow displayed on the window of FIG. 5.

When the "VOXEL SETTING" button 32 in the window 30 is manipulated by using a pointer 50 which is controlled by the input device 11, a subwindow 60 is displayed as illustrated in FIG. 6. The subwindow 60 includes textboxes 62 to 64 for entering parameters q, RA, and L0 relating to VOXELs. The parameter Q is a reference angle based on which edges are detected. That is, when two surfaces of the object 40 meet at an angle which does not exceed the reference angle q, the junction of the two surfaces is detected as an edge. The parameter RA is a ratio L/R, where L is the length of each edge of VOXELs, and R is a radius of curvature of a curved surface produced by rounding off an edge. The parameter L0 is an initial value of the length of each edge of VOXELs. The analytic processing is performed while sequentially decreasing the length of each edge of VOXELs from the initial value L0, i.e., sequentially increasing the number of divisions. When the "setting" button 65 is manipulated after values of the above parameters are entered in the corresponding textboxes 62 to 64, the CPU 10*a* stores the entered values in predetermined areas of the RAM 10*c*.

Figure 7:
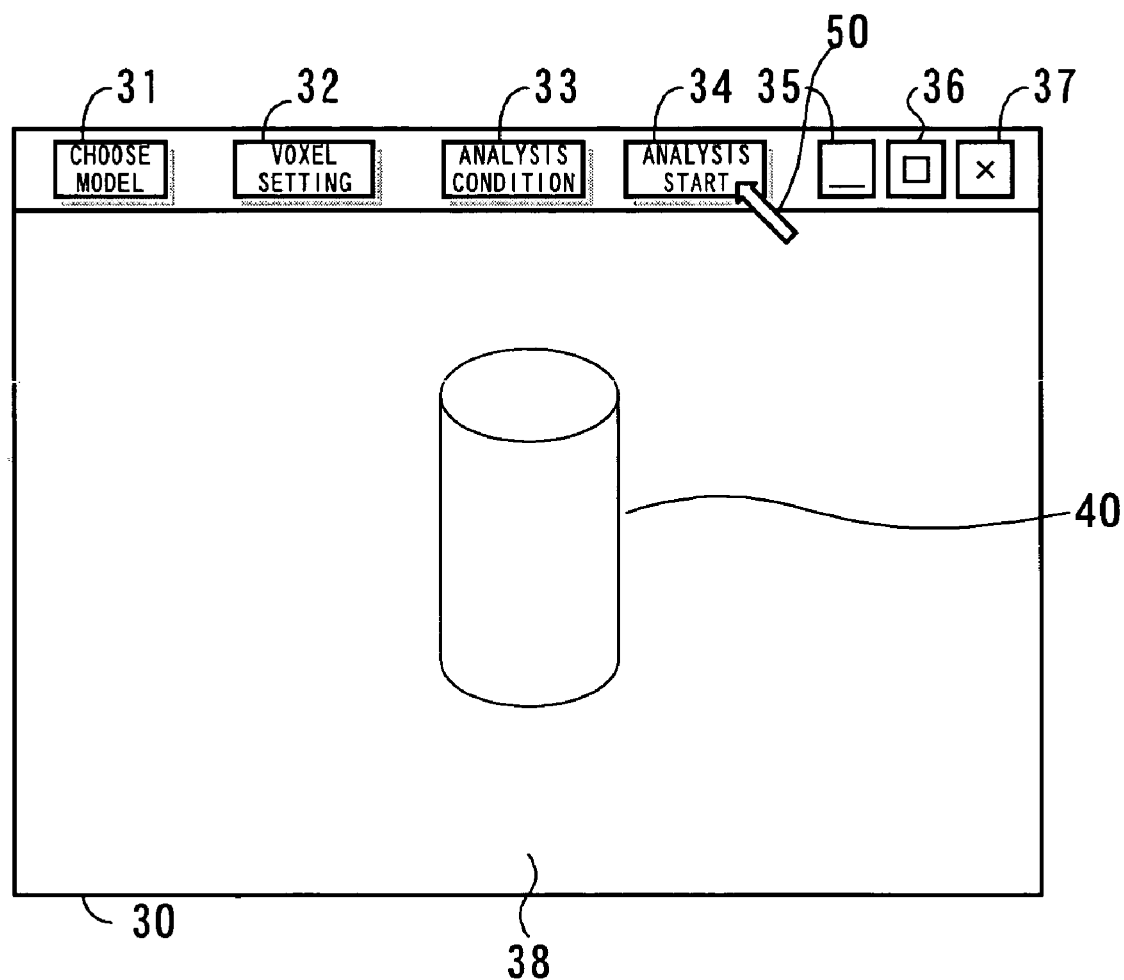
FIG. 7 is a diagram illustrating an example of manipulation of the "ANALYSIS START" button in the window displayed by the display device in FIG. 4.
Figure 8:
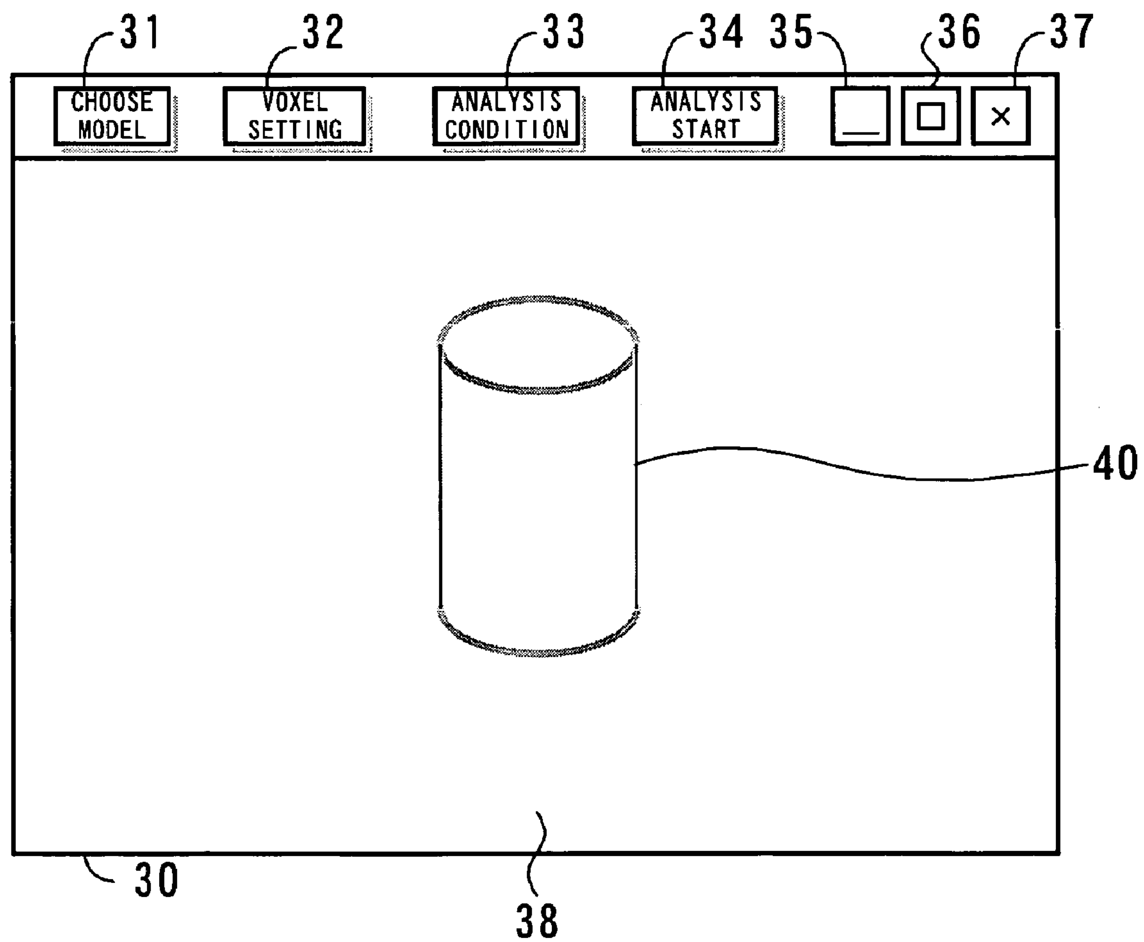
FIG. 8 is a diagram illustrating an example of a window displayed by the display device in FIG. 4, where the object after edge smoothing processing is displayed in the window.

Next, the operator manipulates the "ANALYSIS CONDITION" button 33 in order to set the condition for analysis. For example, the condition for analysis includes positions of constraints, positions of load imposition, values representing material properties, and the like. When the setting of the condition for analysis is completed, and the "ANALYSIS START" button 34 is manipulated as illustrated in FIG. 7, the CPU 10*a* detects junctions of two surfaces in the three-dimensional model data of the object 40, and determines whether or not an angle between two surfaces at each of the detected junctions exceeds the reference angle Q set as illustrated in FIG. 6. When the angle between the meeting surfaces does not exceed the reference angle q, the CPU 10*a* determines that the junction is an edge to be smoothed (rounded off), and performs processing for smoothing (rounding off) the edge. That is, the edge is rounded off so as to form a curved surface having a radius R of curvature, where R=RA×L0. In this example, the edges formed with the cylindrical surface and the top and bottom surfaces are smoothed (rounded off) as illustrated in FIG. 8.

Figure 9:
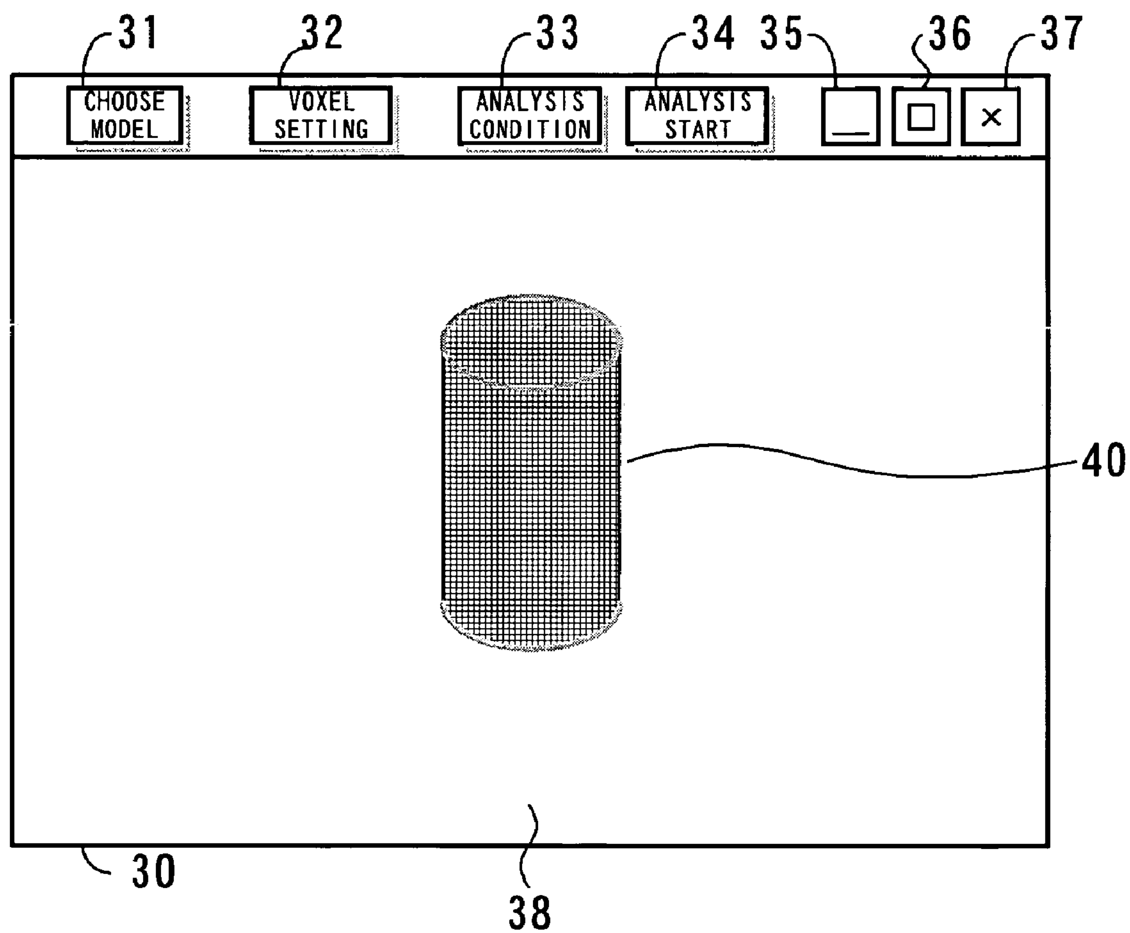
FIG. 9 is a diagram illustrating an example of a window displayed by the display device in FIG. 4 after division of the object into VOXELs.

When the smoothing processing is completed, the CPU 10*a* divides the object 40 into VOXELs based on the parameter L0 (i.e., the initial value of the length of each edge of VOXELs) which is set by using the subwindow 60 as illustrated in FIG. 6. Thus, the object 40 is divided into hexahedral microelements as illustrated in FIG. 9.

When the division is completed, the CPU 10*a* reads out from the HDD 10*d* an analysis program in accordance with the finite element method. Then, the CPU 10*a* executes processing for analyzing the object 40 under the condition for analysis which is set as mentioned before. Thus, a required physical quantity is obtained as a result of the analysis.

Figure 10:
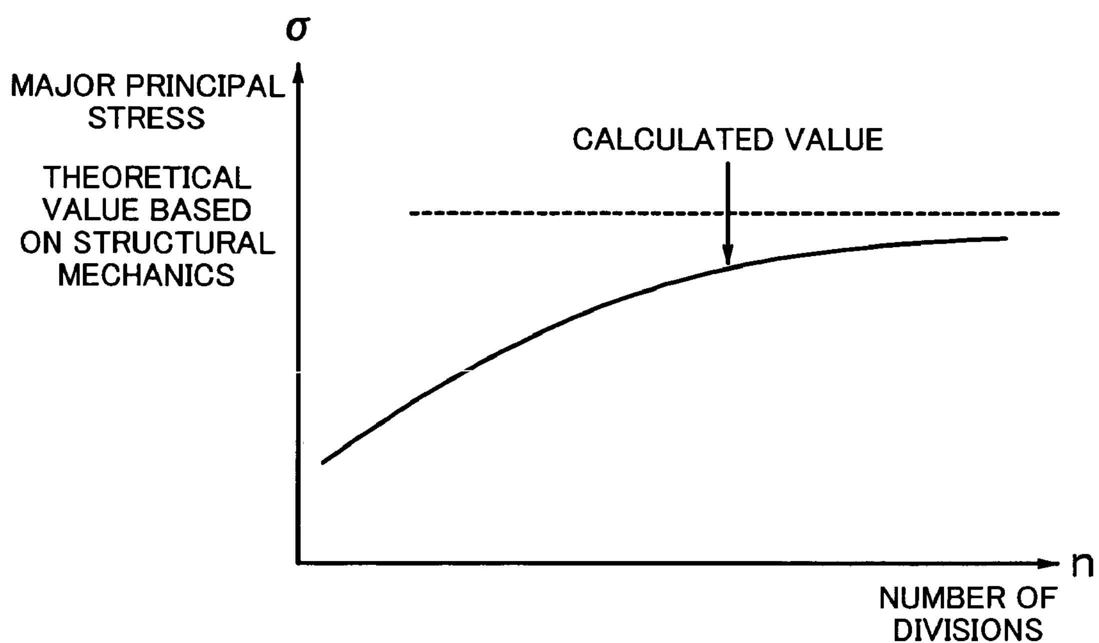
FIG. 10 is a graph indicating a relationship between the number of divisions and a calculated value of the major principal stress in the conventional finite element method.

It is known that generally the accuracy of analysis by the finite element method increases with increase in the number of divisions. However, when the number of divisions increases, the time required for calculation also increases. Therefore, conventionally, the number of divisions is determined by weighing the accuracy of analysis against the time required for calculation. FIG. 10 is a graph indicating an example of a relationship between the number of divisions and a value obtained by analysis in accordance with conventional finite element method. In the example of FIG. 10, the abscissa indicates the number of divisions, and the ordinate indicates the value of the major principal stress obtained by the analysis. In addition, the dashed line indicates the theoretical (true) value based on structural mechanics. Therefore, conventionally, for example, the calculated value indicated by the arrow in FIG. 10 is obtained as a final result of analysis.

Figure 11:
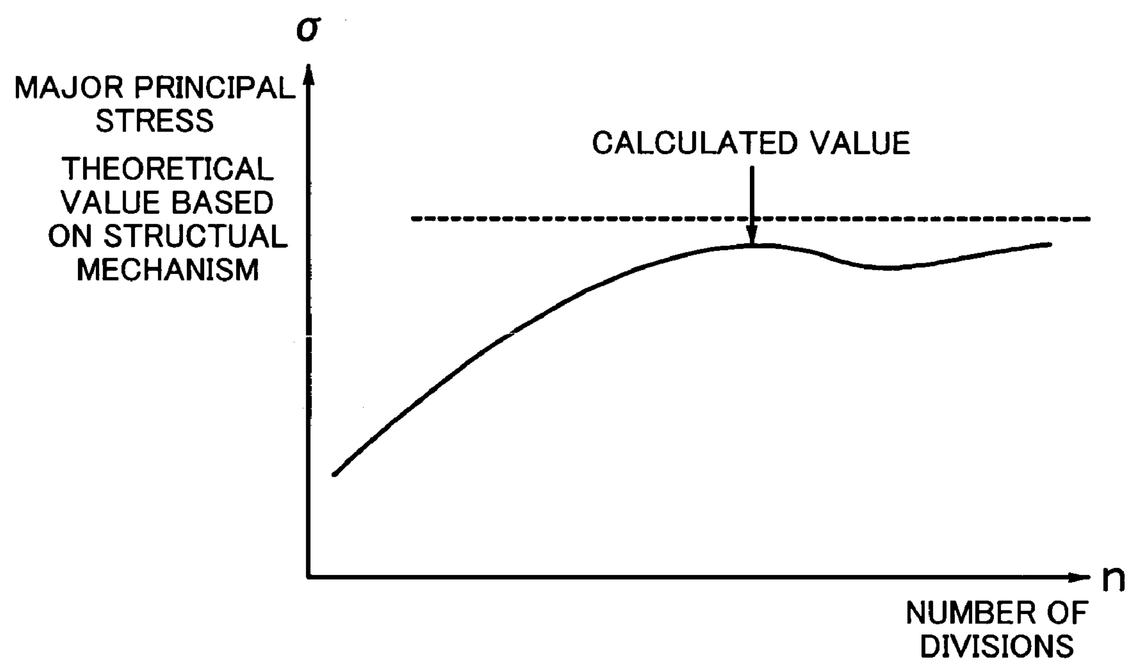
FIG. 11 is a graph indicating a relationship between the number of divisions and a calculated value of the major principal stress in the finite element method according to the present invention.

On the other hand, in the embodiment of the present invention, experiments show that calculated values obtained by analysis has a relationship with the number of divisions as illustrated in FIG. 11. That is, the calculated value obtained by analysis in the embodiment of the present invention does not monotonously increase with the number of divisions. Instead, the calculated values has a local maximum. In addition, the local maximum value is very close to the true value. Therefore, the three-dimensional model analyzing apparatus as the embodiment of the present invention detects the local maximum as a result of analysis.

Specifically, every time an analytic operation based on a certain number of divisions is completed, the CPU 10*a* increases the number of divisions by a predetermined number, and a next analytic operation is performed based on the increased number of divisions. Thus, the analytic operations are performed based on the sequentially increased numbers of divisions until the calculated value obtained by the current analytic operation becomes smaller than the calculated value obtained by a previous analytic operation based on a smaller number of divisions, and the larger calculated value obtained by the previous analytic operation is obtained as the result of the analysis.

In the above processing, the radius R of curvature may be changed corresponding to the increase in the number of divisions. That is, when the number of divisions is increased, the length L of each edge of VOXELs decreases. Therefore, the radius R of curvature can be decreased in accordance with the relationship R=RA×L. In this case, every time an analytic operation based on a certain number of divisions is completed, the CPU 10*a* can update the radius R of curvature in accordance with the above relationship, execute processing for smoothing (rounding off) the edges based on the updated radius R of curvature, and perform analysis in accordance with the finite element method as explained above. Due to the updating of the radius R of curvature, the accuracy of the analysis can be further increased.

As explained above, the three-dimensional model analyzing apparatus as an embodiment of the present invention detects edges of an object to be analyzed, and smooths (rounds off) the edges before analysis. Therefore, singular points of the object to be analyzed can be eliminated, and thus the accuracy of the analysis can be increased.

In addition, the three-dimensional model analyzing apparatus as an embodiment of the present invention obtains as a final result of the analysis a local maximum of values of a physical property which are calculated based on various numbers of divisions. Therefore, a calculated value which is closer to a true value than the value obtained by the conventional technique can be obtained quickly.

(4) Sequence of Operations

Figure 12:
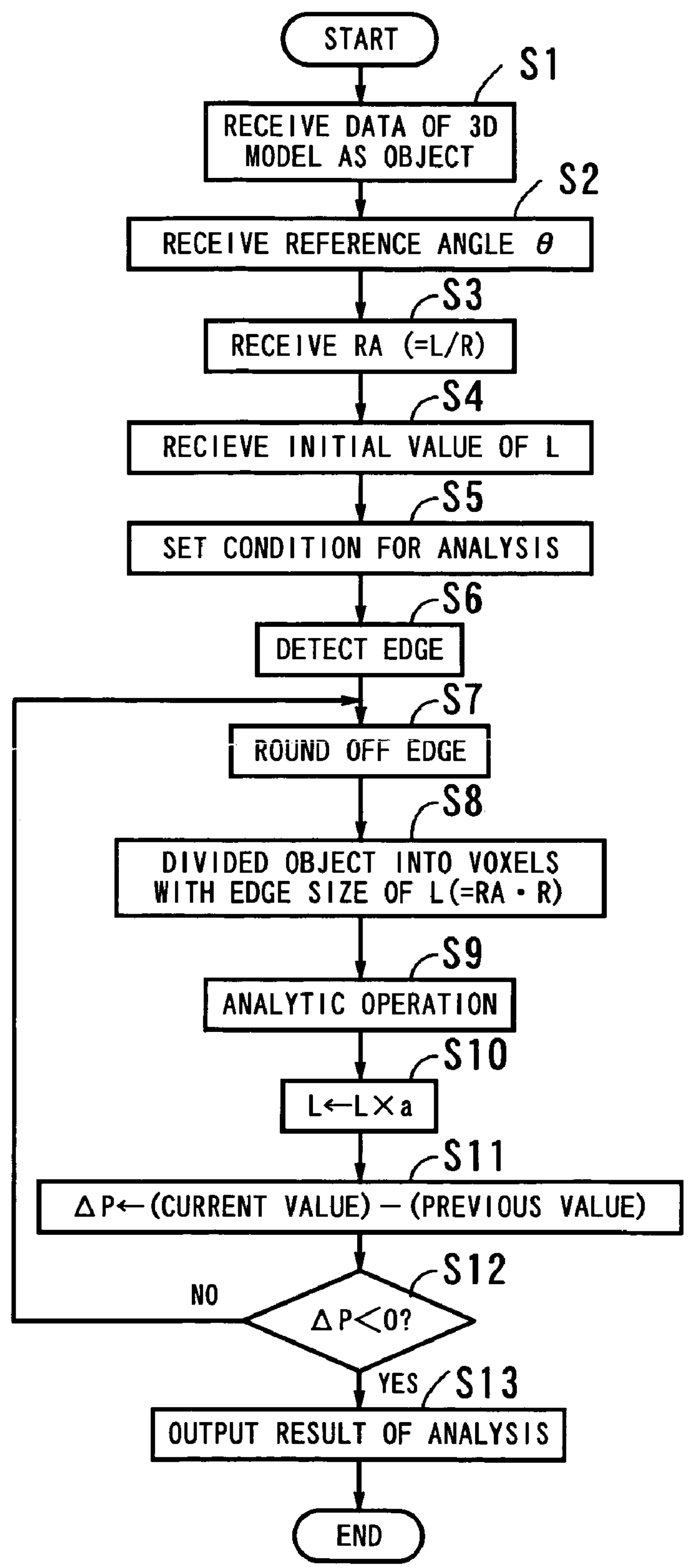
FIG. 12 is a flow diagram illustrating an example of a sequence of operations performed in an embodiment of the three-dimensional model analyzing apparatus according to the present invention.

FIG. 12 is a flow diagram illustrating an example of a sequence of operations performed in an embodiment of the three-dimensional model analyzing apparatus according to the present invention.

In step S1, the CPU 10*a* receives information on a three-dimensional model as an object to be analyzed. In step S2, the CPU 10*a* receives the aforementioned reference angle Q, which is entered in the subwindow 60 illustrated in FIG. 6. In step S3, the CPU 10*a* receives the parameter RA which determines the relationship between the length L of each edge of VOXELs and the radius R of curvature. The parameter RA is also entered in the subwindow 60 illustrated in FIG. 6. In step S4, the CPU 10*a* receives the initial value L0 of the length of each edge of VOXELs, which is entered in the subwindow 60 illustrated in FIG. 6. In step S5, the CPU 10*a* receives the aforementioned condition for analysis, which is entered after the manipulation of the "ANALYSIS CONDITION" button 33 in the window 30. In step S6, the CPU 10*a* detects as an edge a junction of two surfaces of the object which form an angle not exceeding the reference angle Q, based on the reference angle q received in step S2. In step S7, the CPU 10*a* executes processing for rounding off the detected edge so as to form a curved surface having a radius R of curvature which is calculated based on the length L of each edge of VOXELs (having the initial value L0 in the analytic operation in the first cycle). In step S8, the CPU 10*a* divides the object into the VOXELs having edges of the length L. In step S9, the CPU 10*a* performs analysis of the divided object in accordance with the finite element method, and obtains a value as a result of an analytic operation in the current cycle. In step S10, the CPU 10*a* obtains a product of the length L and a predetermined value a, and updates the length L with the product, where $0<a<1$. Alternatively, the CPU 10*a* may subtract a predetermined value b from the length L, and update the length L with the remainder after the subtraction, where $0<b<1$. In step S11, the CPU 10*a* subtracts the result of the analytic operation in the previous cycle, from the result of the analytic operation in the current cycle, and stores the difference in the result of the analytic operation between the current and previous cycles, as a value ΔP. In step S12, the CPU 10*a* determines whether or not the value ΔP is a negative value. When yes is determined, the operation goes to step S13. When no is determined, the operation goes back to step S7 in order to perform operation in the next cycle. That is, when the value of the length L becomes smaller than the length corresponding to a local maximum of the results of the analytic operations, the value DP becomes a negative value. Therefore, in this case, the operation goes to step S13. In step S13, the CPU 10*a* outputs a final result of the analysis. Thus, the aforementioned functions of the three-dimensional model analyzing apparatus can be realized by the above sequence of operations.

(5) Other Matters (i) Although, in the above embodiment, the edges are rounded off so as to form curved surfaces, the edges may be smoothed with planar surfaces instead of the curved surfaces. In this case, the planar surfaces may include a straight line passing through points at which a circular arc having a radius R of curvature is in contact with original surfaces of the three-dimensional model in vicinities of each edge.

(ii) Although the stress analysis is performed in the above embodiment, the present invention can be applied to three-dimensional model analyzing apparatuses which perform analysis of any other property of an object.

(iii) The functions of the three-dimensional model analyzing apparatus according to the present invention can be realized by a computer. The functions of the three-dimensional model analyzing apparatus can be written as a program, which can be stored in a computer-readable storage medium. The functions can be realized by a computer by executing the program. The computer-readable storage medium may be a magnetic storage device, a semiconductor memory, or the like. In order to put the program into the market, the program may be stored in a portable storage medium such as a CD-ROM (compact-disk read-only memory) and a floppy disc. Alternatively, the programs can be stored in a storage device belonging to a first computer, and transferred to a second computer connected through a network to the first computer. When the program is executed by a computer, the program can be stored in a hard disk drive or the like belonging to the computer, and loaded into a main memory of the computer.

(iv) The foregoing is considered as illustrative only of the principle of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

(v) All of the contents of the Japanese patent application, No.2000-174926 are incorporated into this specification by reference.

What is claimed is:

1. A three-dimensional model analyzing apparatus for analyzing a physical property of a three-dimensional model, comprising:

an information receiving unit which receives information on a three-dimensional model as an object to be analyzed;

an edge detecting unit which detects an edge of said three-dimensional model;

a smoothing unit which smoothes said edge and transforms said edge into a curved surface having a predetermined radius of curvature;

an analyzing unit which analyzes said three-dimensional model in accordance with a finite element method after said edge is smoothed by said smoothing unit and after dividing the three-dimensional model into a plurality of hexahedral elements which are formed with edges each having a length shorter than said predetermined radius of curvature; and a number-of-divisions varying unit which varies the number of said plurality of hexahedral elements, wherein said analyzing unit determines a converged value of a physical quantity based on a local maximum of calculated values of said physical quantity which are obtained while increasing the number of said plurality of hexahedral elements by said number-of-divisions varying unit.

2. A three-dimensional model analyzing apparatus according to claim 1, wherein said edge detecting unit detects only at least one edge having an angle which does not exceed a predetermined amount.

3. A computer-readable storage medium storing a program which makes a computer execute a process for analyzing a physical property of a three-dimensional model, said program further makes said computer realize:

an information receiving unit which receives information on a three-dimensional model as an object to be analyzed;

an edge detecting unit which detects an edge of said three-dimensional model;

a smoothing unit which smoothes said edge and transforms said edge into a curved surface having a predetermined radius of curvature;

an analyzing unit which analyzes said three-dimensional model in accordance with a finite element method after said edge is smoothed by said smoothing unit and after dividing the three-dimensional model into a plurality of hexahedral elements which are formed with edges each having a length shorter than said predetermined radius of curvature; and a number-of-divisions varying unit which varies the number of said plurality of hexahedral elements, wherein said analyzing unit determines a converged value of a physical quantity based on a local maximum of calculated values of said physical quantity which are obtained while increasing the number of said plurality of hexahedral elements by said number-of-divisions varying unit.

4. A method comprising:

detecting an edge of a 3D model;

smoothing the detected edge to form a curved surface having a predetermined radius;

dividing the 3D model into hexahedral elements wherein the length of each edge of the hexahedral elements is less than the predetermined radius; and analyzing the 3D model.

* * * * *